United States Patent
Chen

(10) Patent No.: US 8,426,049 B2
(45) Date of Patent: Apr. 23, 2013

(54) BATTERY COVER ASSEMBLY FOR PORTABLE ELECTRONIC DEVICE

(75) Inventor: Yu-Fei Chen, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 958 days.

(21) Appl. No.: 12/490,474

(22) Filed: Jun. 24, 2009

(65) Prior Publication Data

US 2010/0119925 A1    May 13, 2010

(30) Foreign Application Priority Data

Nov. 13, 2008 (CN) .......................... 2008 1 0305541

(51) Int. Cl.
*H01M 2/10* (2006.01)
(52) U.S. Cl.
USPC ............ 429/100; 429/162; 429/163; 429/175
(58) Field of Classification Search .................. 429/100, 429/163, 175, 162
See application file for complete search history.

(56) References Cited

U.S. PATENT DOCUMENTS

2005/0272488 A1   12/2005   Zou
2007/0111086 A1*   5/2007   Li et al. ......................... 429/97

FOREIGN PATENT DOCUMENTS

CN          101241978 A        8/2008

* cited by examiner

*Primary Examiner* — Jane Rhee
(74) *Attorney, Agent, or Firm* — Altis Law Group, Inc.

(57) ABSTRACT

A battery cover assembly using for accommodating a battery therein comprises a battery cover and a housing. The battery cover has a plurality of arcuate elements protruding therefrom. Each arcuate element has a latching portion protruding therefrom. The housing has a plurality of guiding grooves corresponding to the arcuate elements of the battery cover. The housing further has a plurality of troughs latching with the latching portions and a plurality of notches corresponding to the troughs. The arcuate elements are rotatably received in the guiding grooves. The notches communicate with the troughs, the latching portions releasably latches into the troughs via the notches. When the latching portions is received into the troughs, the battery cover is rotated relative to the housing to latch the latching portions in the troughs.

6 Claims, 6 Drawing Sheets

BATTERY COVER ASSEMBLY FOR PORTABLE ELECTRONIC DEVICE

BACKGROUND

1. Technical Field

The present invention generally relates to battery cover assemblies, and particularly to battery cover assemblies used in portable electronic devices.

2. Description of Related Art

Portable electronic devices usually include latch mechanisms for latching battery covers to housings. The latch mechanisms must tolerate frequent installation and removal of batteries relative to the housing.

A typical battery cover latch mechanism includes a battery cover and a housing. The battery cover may slide relative to and then latch with the housing by a sliding-type structure. However, the battery cover can be damaged during disassembly.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the exemplary battery cover assembly and portable electronic device using battery cover assembly. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
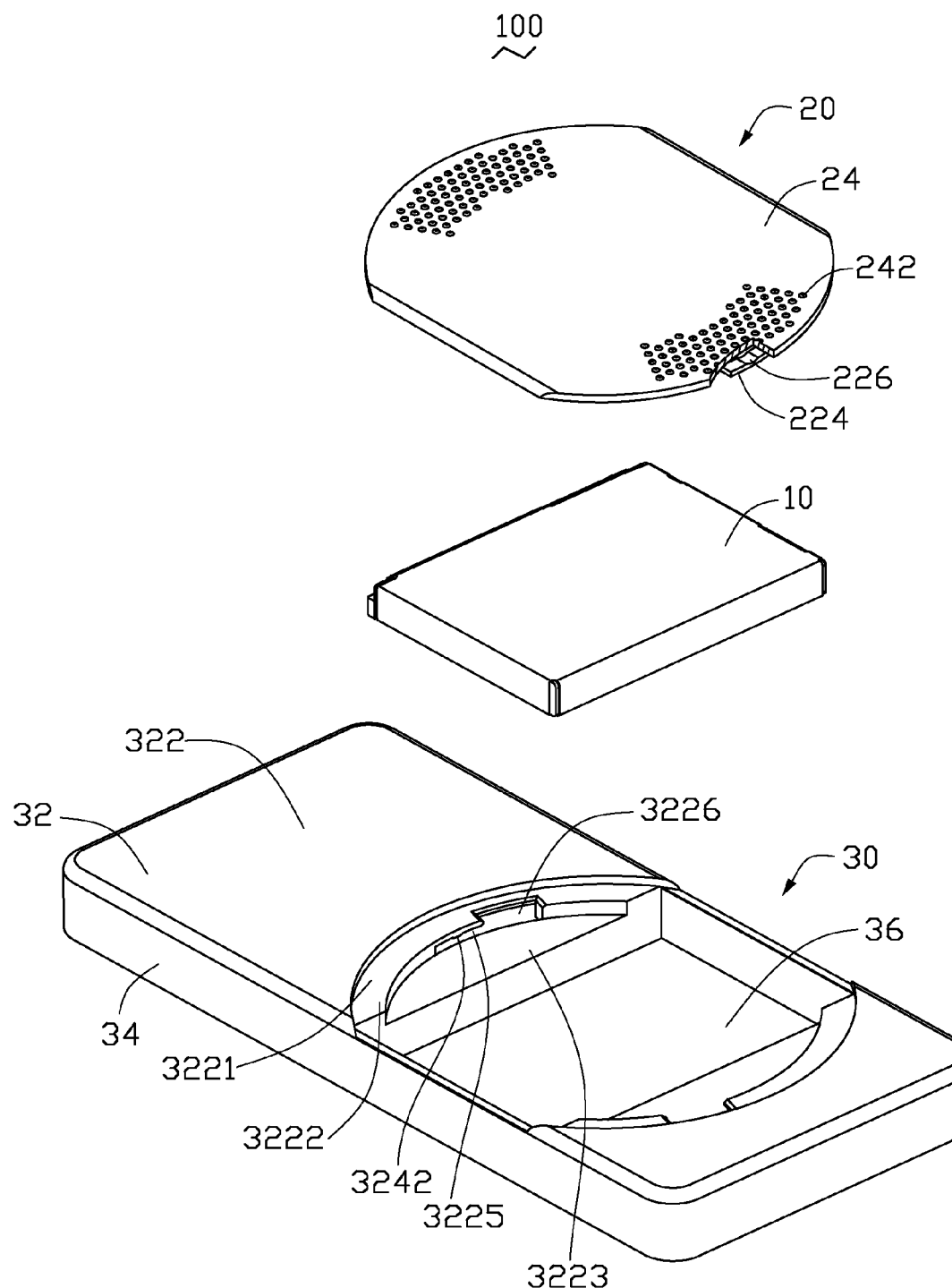
FIG. 1 is an exploded, isometric view of an exemplary embodiment of a battery assembly used for holding a battery therein, the battery assembly including a battery cover, a housing and an elastic member.
Figure 2:
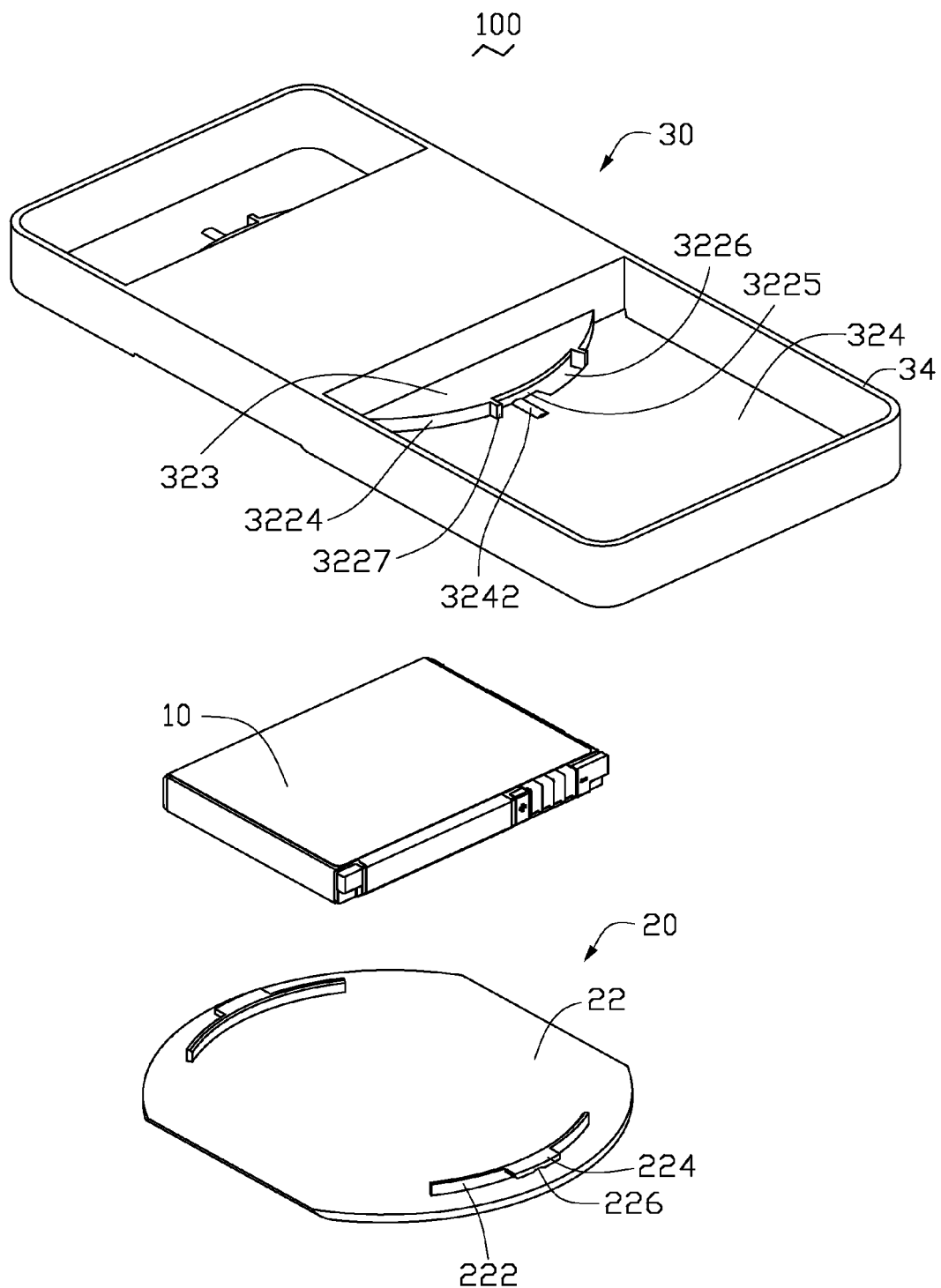
FIG. 2 is similar to FIG. 1, but showing the battery assembly in another view.

Referring to FIGS. 1 and 2, an exemplary embodiment of a battery cover assembly 100 used in a portable electronic device (e.g., mobile phone) for accommodating a battery 10 therein is shown. The battery cover assembly 100 includes a battery cover 20 and a housing 30 releasably latching with the battery cover 20.

The battery cover 20 is a substantially elliptical plate and includes a first surface 22 facing the housing 30 and a second surface 24 opposite to the first surface 22. The battery cover 20 has two symmetrical arcuate elements 222 protruding from the first surface 22. One arcuate element 222 is located adjacent to and protrudes along one end of the battery cover 20, and the other arcuate element 222 is located adjacent to and protrudes along another end of the battery cover 20. Each arcuate element 222 has a latching portion 224 protruding from one side thereof and facing away from the other arcuate element 222. The latching portions 224 are parallel to the first surface 22. Each latching portion 224 has an arcuate slot 226 defined in one side thereof and facing the first surface 22. The battery cover 20 has a plurality of protrusions 242 protruding from the second surface 24. The area, where the protrusions 242 are located at the second surface 24 respectively corresponds to the area, where the arcuate elements 222 are located at the first surface 22. The protrusions 242 are configured for enhancing the roughness of the second surface 24 to facilitate manual operation of the battery cover 20.

The housing 30 includes a bottom wall 32 and a peripheral wall 34 perpendicularly connected with bottom wall 32. The bottom wall 32 includes an exterior surface 322 and an inner surface 324. The housing 30 has a receiving groove 3221 defined in the exterior surface 322, and a footwall 3222 defined in the receiving groove 3221. The receiving groove 3221 corresponds in shape to the battery cover 20 and is configured for accommodating the battery cover 20 therein.

The housing 30 has a concave portion 36 for accommodating the battery 10 therein. A portion of the footwall 3222 located adjacent to two opposite sides of the concave portion, is depressed toward the inner surface 324 of the housing 30 to define two arcuate guiding grooves 3223 corresponding to the arcuate elements 222 of the battery cover 20, thus forming two arcuate projections 323 protruding from the inner surface 324.

Each arcuate projection 323 has a sidewall 3224 perpendicularly connected with the inner surface 324. Each sidewall 3224 has a trough 3225 defined therethrough and configured to latch with the latching portion 224 of the battery cover 20. Each sidewall 3224 has two stopping sections 3227 protruding outwardly thereof. Each stopping section 3227 is located adjacent to an end of the trough 3225. The stopping sections 3227 are used for stopping the latching portions 224 when the latching portions 224 slide in the trough 3225.

The footwall 3222 has two notches 3226 defined therethrough and corresponding to the troughs 3225. The notches 3226 correspondingly communicate with the troughs 3225, the latching portions 224 enter into the troughs 3225 via the notches 3226. The housing 30 has two arcuate blocks 3242 protruding from the inner surface 324 thereof. The blocks 3242 correspondingly locate adjacent to the sidewalls 24, and substantially perpendicularly to the sidewalls 24. The blocks 3242 are correspondingly accommodated in the slots 226 when the latching portions 224 are correspondingly latched in the troughs 3225.

Figure 3:
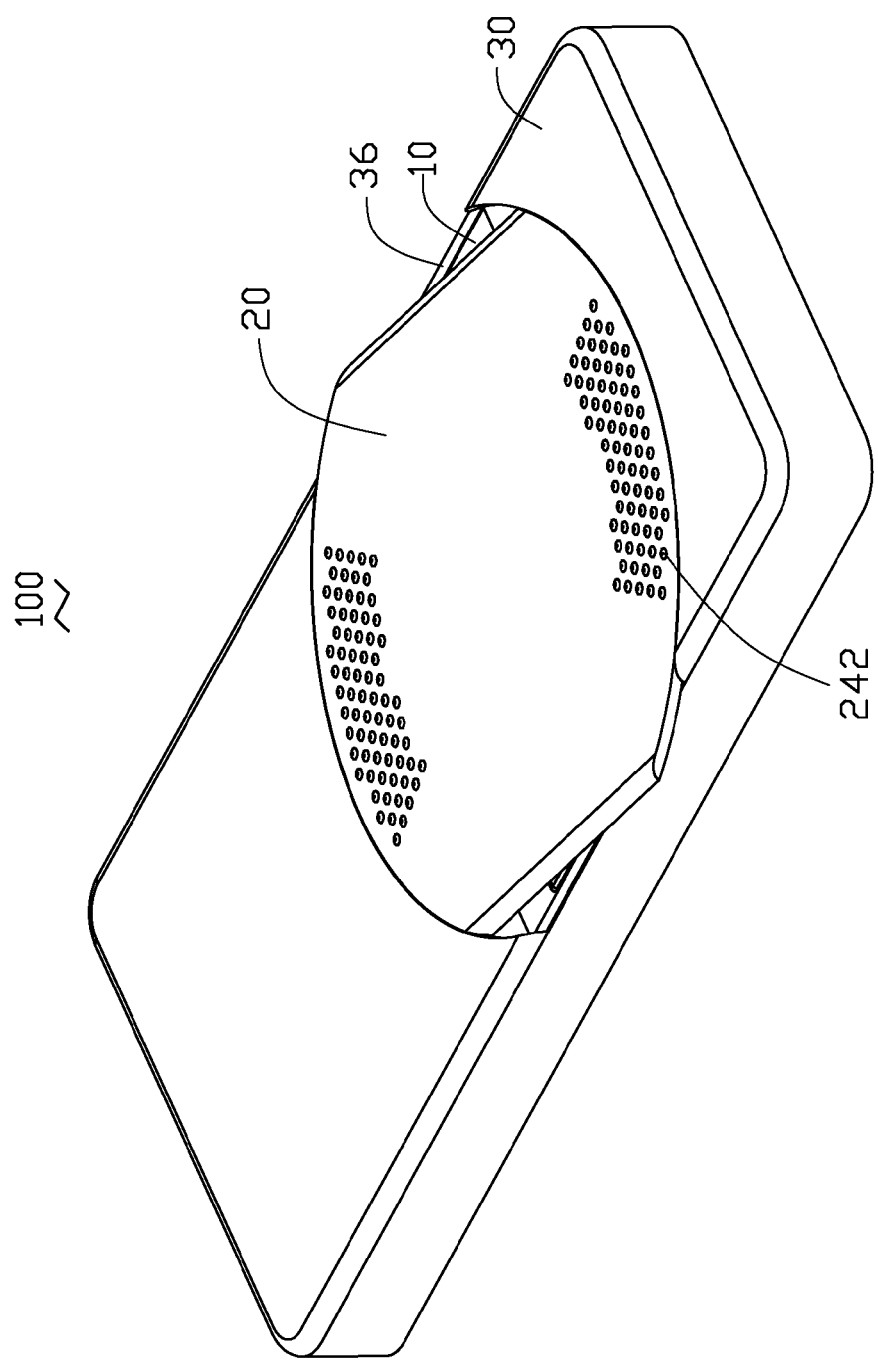
FIG. 3 is a schematic view of which a latching portion of a battery cover shown in FIG. 1 aligned with an opening of a housing shown in FIG. 1.
Figure 4:
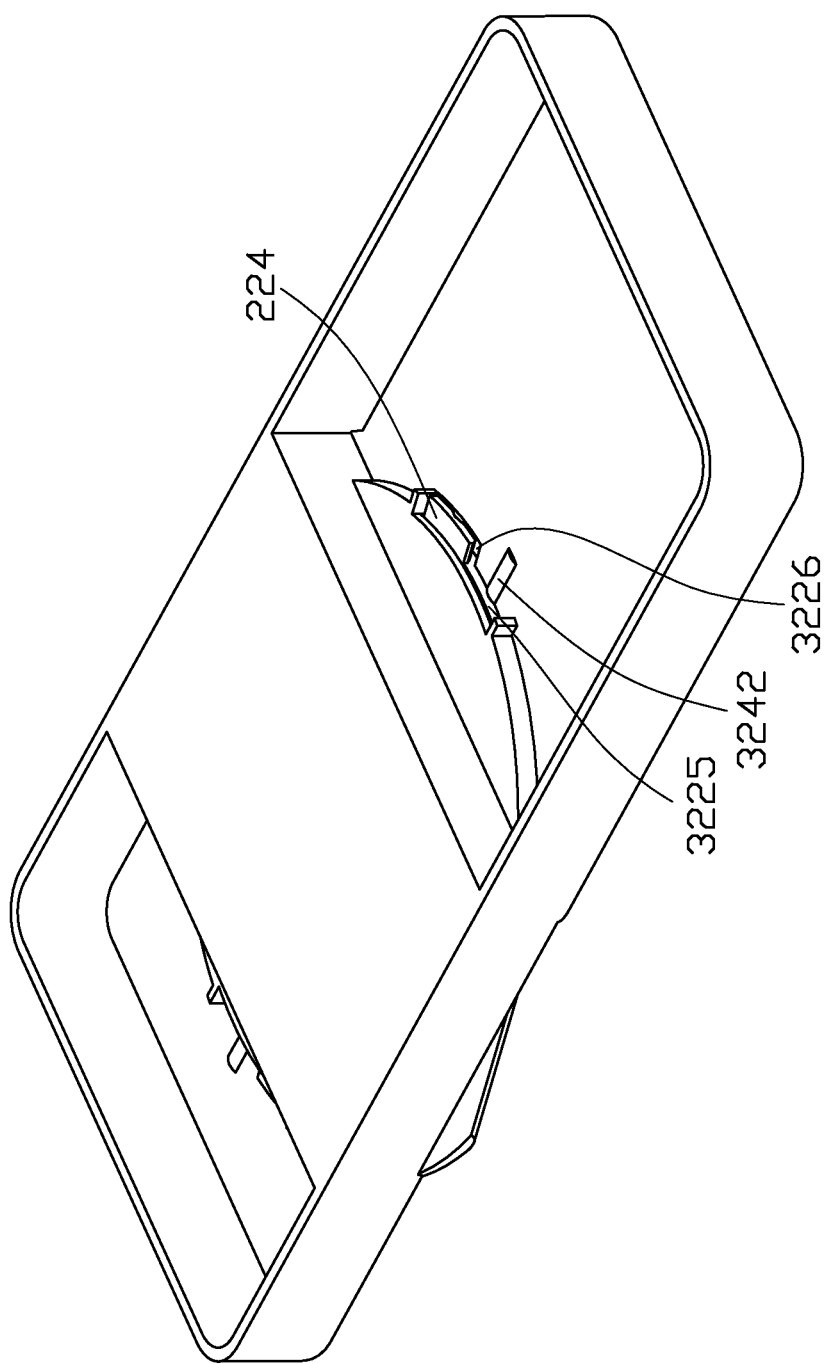
FIG. 4 is a schematic view of which a latching portion of a battery cover shown in FIG. 2 aligned with an opening of a housing shown in FIG. 2.
Figure 5:
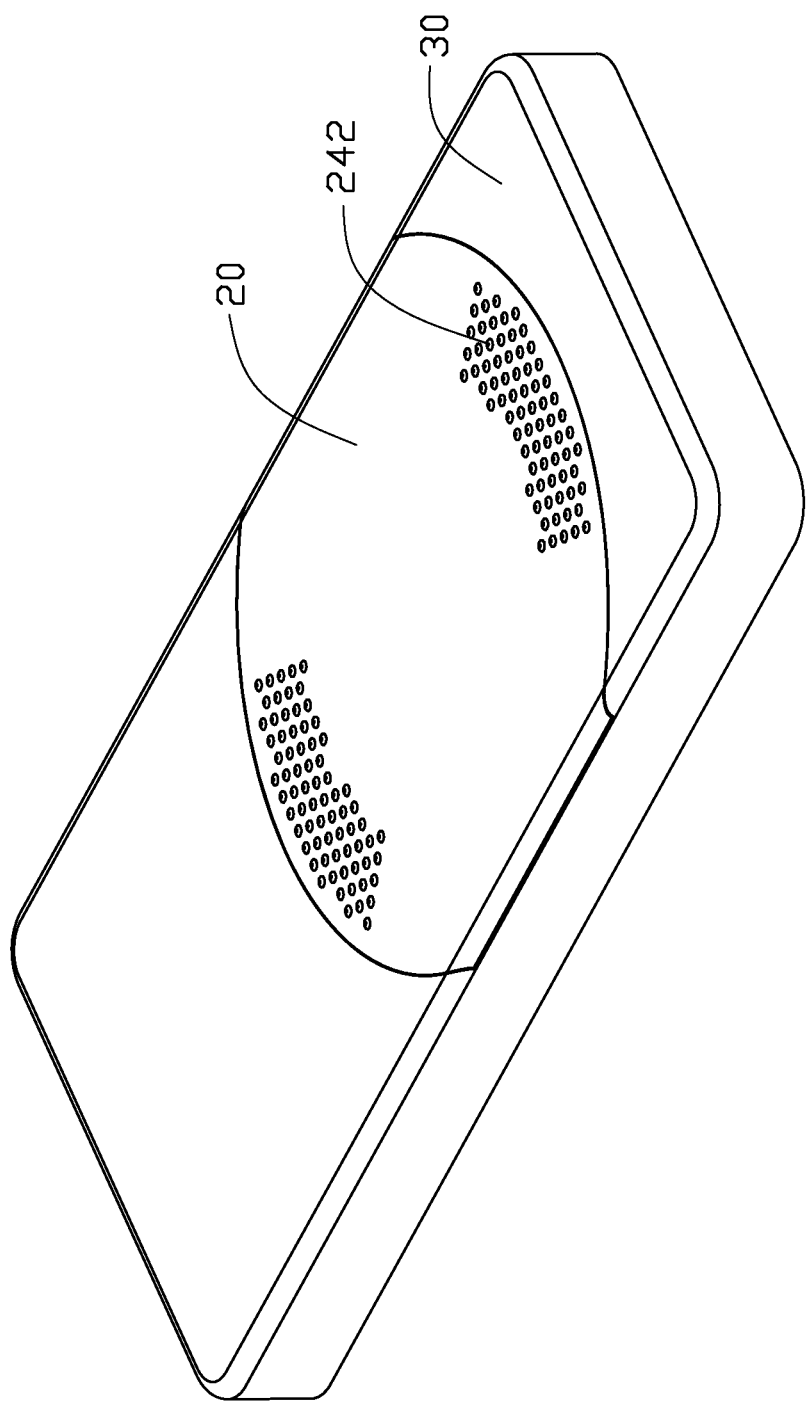
FIG. 5 is similar to FIG. 3, but the latching portion of the battery cover is latching within the opening of the housing.
Figure 6:
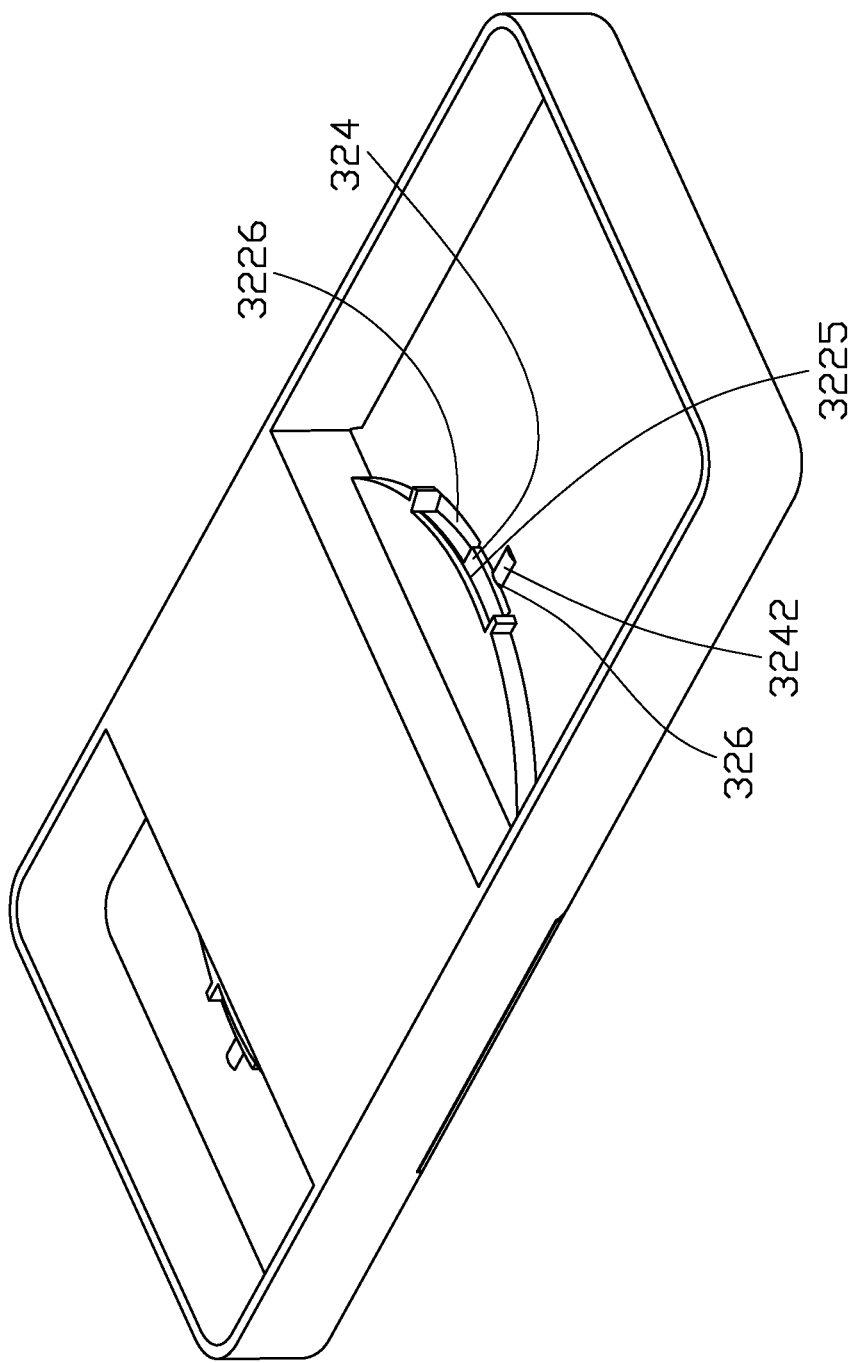
FIG. 6 is similar to FIG. 4, but the latching portion of the battery cover is latching within the opening of the housing.

Referring to FIGS. 3 and 4, when using the battery cover assembly 100, first, the battery 10 is placed in the concave portion 36 of the housing 30. Then, the latching portions 224 of the battery cover 20 are aligned with the notches 3226 of the housing 30. The battery cover 20 is pressed into the receiving groove 3221 of the housing 30 such that the latching portions 224 enter into the trough 3225 from the notch 3226. At this stage, the arcuate elements 222 are correspondingly located in the guiding grooves 3223. Referring to FIGS. 5 and 6, then the battery cover 20 is rotated relative to the housing 30 until the latching portions 224 are latched with the troughs 3225 and the blocks 3242 are latched in the slots 226, thereby the battery cover 20 is stably latched on the housing 30.

When detaching the battery from the housing 30, the protrusions 242 of the battery cover 20 is pressed to make the battery cover 20 rotated reversely relative to the housing 30, as a result, the blocks 3242 of the housing 30 are released from the slots 226 of the battery cover 20. The battery cover 20 is continuously rotated relative to the housing 30 until the latching portions 224 are aligned with the notches 3226, such that the battery cover 20 can freely release from the receiving groove 3221 of the housing 30. The battery cover 20 is detached from the housing 30, so the battery can freely slide out of the concave portion 36 of the housing 30.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover assembly using for accommodating a battery therein, the battery cover assembly comprising:
   a battery cover including a first surface and a second surface parallel to each other, the first surface having two symmetrical arcuate elements perpendicularly protruding therefrom, each arcuate element having a latching portion protruding therefrom in a direction parallel to the first surface;
   a housing defining a receiving groove with a footwall and two arcuate guiding grooves each with a sidewall, the battery cover first surface received in the housing's receiving groove and supported by the footwall, the battery cover arcuate elements received in the housing's arcuate guiding grooves and abutting against a first side of the sidewalls; the foot wall defining two notches, each of the sidewalls defining a trough communicating with a corresponding notch and a corresponding arcuate guiding groove;
   wherein the battery cover latching portions engage in the troughs through the notches and extend to a second side of the sidewalls, the battery cover are rotatably positioned in the receiving groove along an axis perpendicular to the first surface to move the latching portions to a predetermined position in the troughs for latching the battery cover to the housing.

2. The battery cover assembly of claim 1, wherein each latching portion has a slot in one side thereof and facing the first surface, the housing includes an exterior surface and an inner surface, the receiving groove and the arcuate guiding grooves are defined in the exterior surface, the inner surface includes two arcuate blocks adjacent to the troughs, the arcuate blocks are received in the slots of the latching portions for positioning the battery cover on the housing.

3. The battery cover assembly of claim 2, wherein a second side of the sidewall includes a stopping section at each of opposite ends of the trough, the stopping sections stop the latching portions in the troughs.

4. A battery cover assembly using for accommodating a battery therein, the battery cover assembly comprising:
   a battery cover including two arcuate ends, a first surface and a second surface parallel to each other, the first surface having two symmetrical arcuate elements perpendicularly protruding therefrom, each arcuate element having a latching portion protruding therefrom in a direction parallel to the first surface;
   a housing defining a receiving groove and two arcuate guiding grooves, each arcuate duding groove including a sidewall, the arcuate ends and the first surface of the battery cover received in the receiving groove, the arcuate elements of the battery cover received in the arcuate guiding grooves of the housing and abutting against a first side of the sidewalls; the receiving groove defining two notches, each of the sidewalls defining a trough communicating with a corresponding notch and a corresponding arcuate guiding groove;
   wherein the latching portions of the battery cover engage in the troughs through the notches, the arcuate ends of the battery cover are rotatably positioned in the receiving groove along an axis perpendicular to the first surface to move the latching portion to a predetermined position in the troughs for latching the battery cover to the housing.

5. The battery cover assembly of claim 4, wherein each latching portion has a slot in one side thereof and facing the first surface, the housing includes an exterior surface and an inner surface, the receiving groove and the arcuate guiding grooves are defined in the exterior surface, the inner surface includes two arcuate blocks adjacent to the troughs, the arcuate blocks are received in the slots of the latching portions for latching the battery cover on the housing in the predetermined position.

6. A portable electronic device comprising:
   a battery cover including two arcuate ends, a first surface and a second surface parallel to each other, the first surface having two symmetrical arcuate elements perpendicularly protruding therefrom, each arcuate element having a latching portion protruding therefrom in a direction parallel to the first surface;
   a housing defining a receiving groove, two arcuate guiding grooves and a concave portion, the concave portion configured for receiving a battery, the two arcuate guiding grooves defined between the receiving groove and the concave portion, each arcuate guiding groove including a sidewall, the arcuate ends and the first surface of the battery cover received in the receiving groove of the housing, the arcuate elements of the battery cover received in the arcuate guiding grooves of the housing and abutting against a first side of the sidewalls; the receiving groove defining two notches, each of the sidewalls defining a trough communicating with a corresponding notch and a corresponding arcuate guiding groove;
   wherein the latching portions of the battery cover engage in the troughs through the notches, the arcuate ends of the battery cover are rotated in the receiving groove along an axis perpendicular to the first surface to move the latching portion to a predetermined position in the troughs for latching the battery cover to the housing.

* * * * *